(12) United States Patent
Wienecke et al.

(10) Patent No.: US 11,453,393 B2
(45) Date of Patent: Sep. 27, 2022

(54) AUTONOMOUS VEHICLE WITH PATH PLANNING SYSTEM

(71) Applicant: Magna Electronics Inc., Auburn Hills, MI (US)

(72) Inventors: Richard Wienecke, Goldbach (DE); Wenxue Gao, Waldaschaff (DE); Achim Gieseke, Gross-Umstadt (GH)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 134 days.

(21) Appl. No.: 16/154,182

(22) Filed: Oct. 8, 2018

(65) Prior Publication Data

US 2019/0106108 A1    Apr. 11, 2019

Related U.S. Application Data

(60) Provisional application No. 62/569,656, filed on Oct. 9, 2017.

(51) Int. Cl.
| | |
|---|---|
| *B60W 30/12* | (2020.01) |
| *B60R 11/04* | (2006.01) |
| *G08G 1/16* | (2006.01) |
| *B60W 30/16* | (2020.01) |
| *B60W 10/18* | (2012.01) |

(Continued)

(52) U.S. Cl.
CPC ............ *B60W 30/12* (2013.01); *B60R 11/04* (2013.01); *B60W 10/18* (2013.01); *B60W 10/20* (2013.01); *B60W 30/162* (2013.01); *G06V 20/58* (2022.01); *G08G 1/167* (2013.01); *B60W 2420/403* (2013.01); *B60W 2420/42* (2013.01); *B60W 2420/52* (2013.01); *B60W 2554/00* (2020.02); *B60W 2556/65* (2020.02); *G06V 20/582* (2022.01); *G06V 20/588* (2022.01)

(58) Field of Classification Search
CPC ...... B60W 30/12; B60W 10/18; B60W 10/20; B60W 30/162; B60W 2554/00; B60W 2556/65; B60W 2420/403; B60W 2420/42; B60W 2420/52; B60W 30/10; B60R 11/04; G06K 9/00805; G06K 9/00798; G06K 9/00818; G08G 1/167
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

OTHER PUBLICATIONS

2016 Tesla Model S Manual (Year: 2016).*

*Primary Examiner* — Jelani A Smith
*Assistant Examiner* — Gabriel Anfinrud
(74) *Attorney, Agent, or Firm* — Honigman LLP

(57) ABSTRACT

A control system for a vehicle includes a control that determines a planned path of travel for the vehicle along a road being traveled by the vehicle and along a traffic lane in which the vehicle is traveling on the road. The control determines a speed profile for the vehicle along the planned path responsive at least in part to (i) detection of an object along the determined planned path of travel and (ii) determination of a speed limit change along the determined planned path of travel. The control controls the vehicle to maneuver the vehicle along the determined planned path of travel in accordance with the determined speed profile.

20 Claims, 14 Drawing Sheets

(51) Int. Cl.
  *B60W 10/20* (2006.01)
  *G06V 20/58* (2022.01)
  *G06V 20/56* (2022.01)

(56) References Cited

U.S. PATENT DOCUMENTS

| | | | |
|---|---|---|---|
| 5,949,331 A | 9/1999 | Schofield et al. | |
| 6,690,268 B2 | 2/2004 | Schofield et al. | |
| 6,693,517 B2 | 2/2004 | McCarthy et al. | |
| 7,038,577 B2 | 5/2006 | Pawlicki et al. | |
| 7,580,795 B2 | 8/2009 | McCarthy et al. | |
| 7,720,580 B2 | 5/2010 | Higgins-Luthman | |
| 7,855,755 B2 | 12/2010 | Weller et al. | |
| 8,013,780 B2 | 9/2011 | Lynam | |
| 8,027,029 B2 | 9/2011 | Lu et al. | |
| 8,473,144 B1* | 6/2013 | Dolgov | G01C 21/3407 701/28 |
| 9,036,026 B2 | 5/2015 | Dellantoni et al. | |
| 9,146,898 B2 | 9/2015 | Ihlenburg et al. | |
| 9,810,164 B2* | 11/2017 | Aoki | B60T 5/00 |
| 10,086,870 B2 | 10/2018 | Gieseke et al. | |
| 10,115,310 B2 | 10/2018 | Pflug | |
| 10,214,206 B2 | 2/2019 | Latotzki | |
| 10,328,932 B2 | 6/2019 | Gieseke et al. | |
| 2013/0211656 A1* | 8/2013 | An | G05D 1/0285 701/25 |
| 2014/0063232 A1* | 3/2014 | Fairfield | B60T 7/18 348/118 |
| 2014/0129086 A1* | 5/2014 | Takenaka | B62D 6/003 701/41 |
| 2015/0124096 A1 | 5/2015 | Koravadi | |
| 2015/0251599 A1 | 9/2015 | Koravadi | |
| 2016/0035223 A1* | 2/2016 | Gutmann | G08G 1/09626 340/907 |
| 2016/0036917 A1 | 2/2016 | Koravadi et al. | |
| 2017/0197619 A1* | 7/2017 | Kelly | B60W 10/04 |
| 2017/0254873 A1 | 9/2017 | Koravadi | |
| 2017/0274898 A1* | 9/2017 | Nakamura | B60T 5/00 |
| 2017/0276788 A1 | 9/2017 | Wodrich | |
| 2017/0315231 A1 | 11/2017 | Wodrich | |
| 2017/0329346 A1 | 11/2017 | Latotzki | |
| 2017/0356994 A1 | 12/2017 | Wodrich et al. | |
| 2018/0015875 A1 | 1/2018 | May et al. | |
| 2018/0339714 A1 | 11/2018 | Smid et al. | |

* cited by examiner

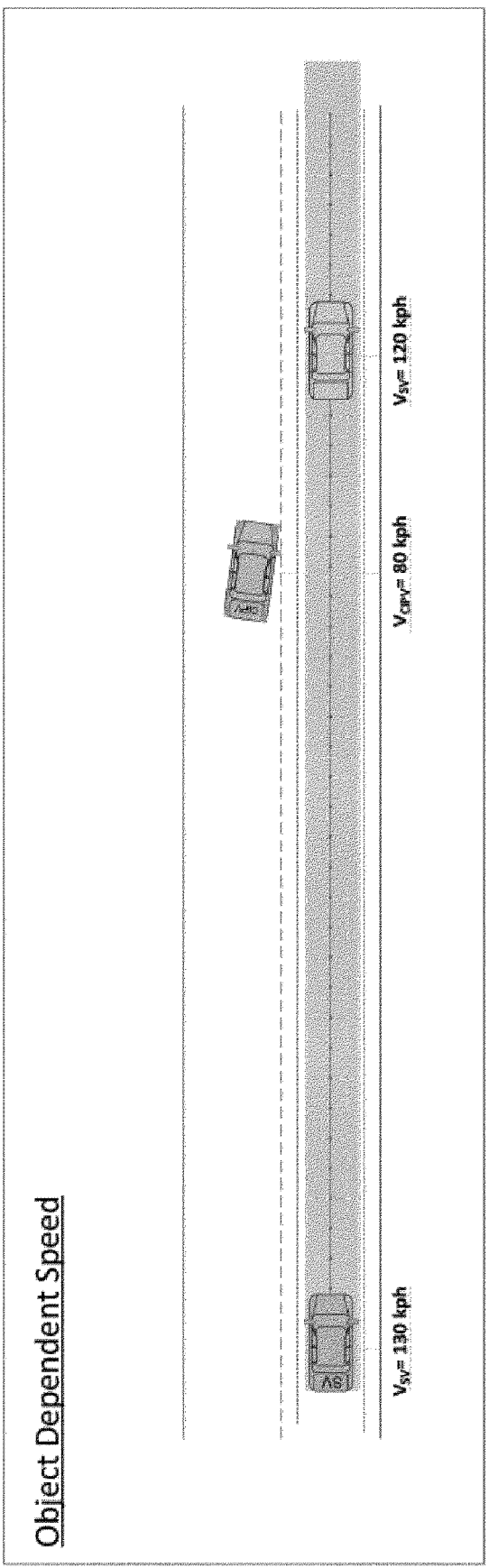
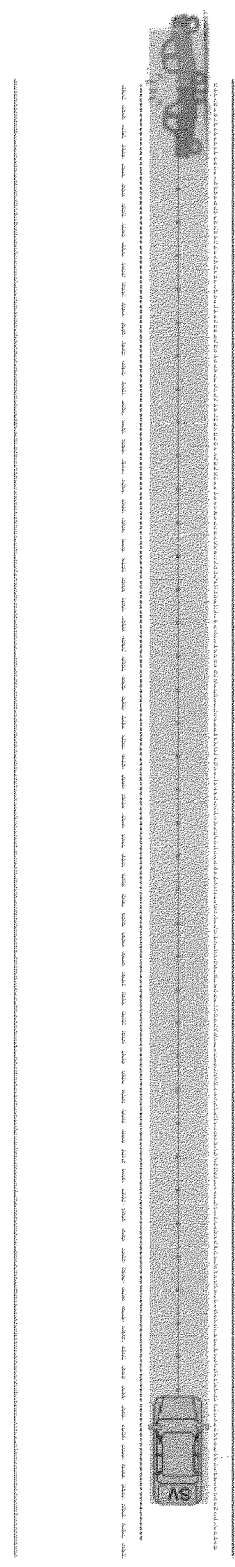
Object Dependent Speed
FIG. 8C
Event Point Speed
FIG. 8D

AUTONOMOUS VEHICLE WITH PATH PLANNING SYSTEM

CROSS REFERENCE TO RELATED APPLICATION

The present application claims the filing benefits of U.S. provisional application Ser. No. 62/569,656, filed Oct. 9, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driving assistance system or control system for a vehicle that is operable to determine a planned path of travel for the vehicle along a road being traveled by the vehicle and along a lane in which the vehicle is traveling. The control system determines a speed profile for the vehicle along the planned path, and the speed profile is determined responsive at least in part to (i) detection of an object along the determined planned path, (ii) determination of a speed limit change along the determined planned path, and (iii) a user selected speed. The control controls the vehicle to maneuver the vehicle along the determined planned path and in accordance with the determined speed profile.

These and other objects, advantages, purposes and features of the present invention will become apparent upon review of the following specification in conjunction with the drawings.

BRIEF DESCRIPTION OF THE DRAWINGS

FIGS. 8A-D are plan view schematics showing how the planned path may vary depending on detection of other vehicles and/or detection of traffic signs;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
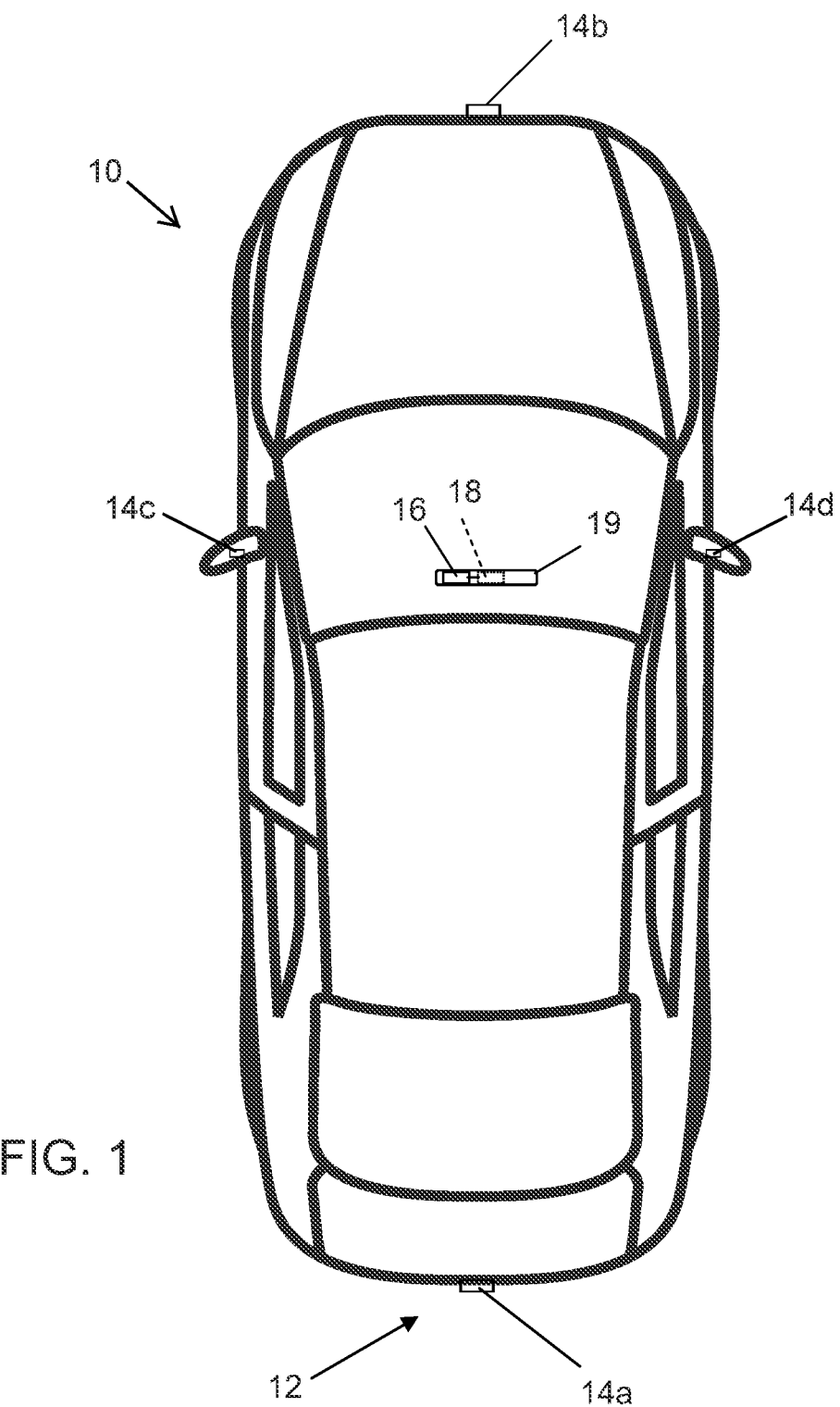
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two-way communication with other vehicles or infrastructure, such as via a car2car (V2V) or car2x communication system.

When operating vehicles autonomously or semi-autonomously or partially automated, such as when operating in an advanced or adaptive cruise control (ACC) mode, the vehicle control typically has three main tasks: the environmental perception or scene detection and context interpretation, the planning of a safe path towards the destination, and the drive execution of the determined path. The present invention provides a path planner or path planning system. It may be assumed that the scene perception and the drive control task may be present, solved in a sufficient manner but having typical limitations. Since the scene perception is typically relying on vehicle inherent sensors, the typical shortcomings may appear as well, such as limited sensor range and limited precision in the drive execution.

In accordance with an aspect or property of the path planner of the present invention, the path planner may have speed profile planning, which gets adapted to a speed independent drafted path. In a first phase a primary path may be drafted (see FIG. 2). The environmental perception may deliver a map, which may comprise a first portion which is comprised by non-real time data, such as a local navigation system's map data or historically stored environmental perception data, or such information may be provided (via, for example, wireless communication) by a map data server or indirectly from other vehicles (or other remote systems) that have passed the concerning mapped geo spot before, possibly just seconds before, or such information may be stored earlier by the ego vehicle's system, such as, for example, the day before when passing the same road's identical lane.

The map delivered by the environmental perception may comprise a second portion of real time data which may be picked up by the vehicle inherent sensors, such as RGB or near or far infrared vision sensors, RADAR sensors, LIDAR sensors, ultrasonic sensors, otherwise acoustic sensors or spectrographic sensors. The sensor's data may get fused into the non-real time map (first portion) according to the ego vehicle position or geographical location.

The environmental perception may additionally deliver a scene context interpretation including the free space in front of the vehicle, the lane marking boundaries, collision hazard objects (for example, every object with an elevation of around 10 cm) and optionally the road type, weather condition and road friction condition. The environmental perception may additionally deliver a score as to how reliable each sensor's (single) data is or a score as to how reliable the fused sensor's common data set is. The environmental perception may additionally deliver a score, estimation or value as to how far the single or fused sensor range actually is.

Figure 2:
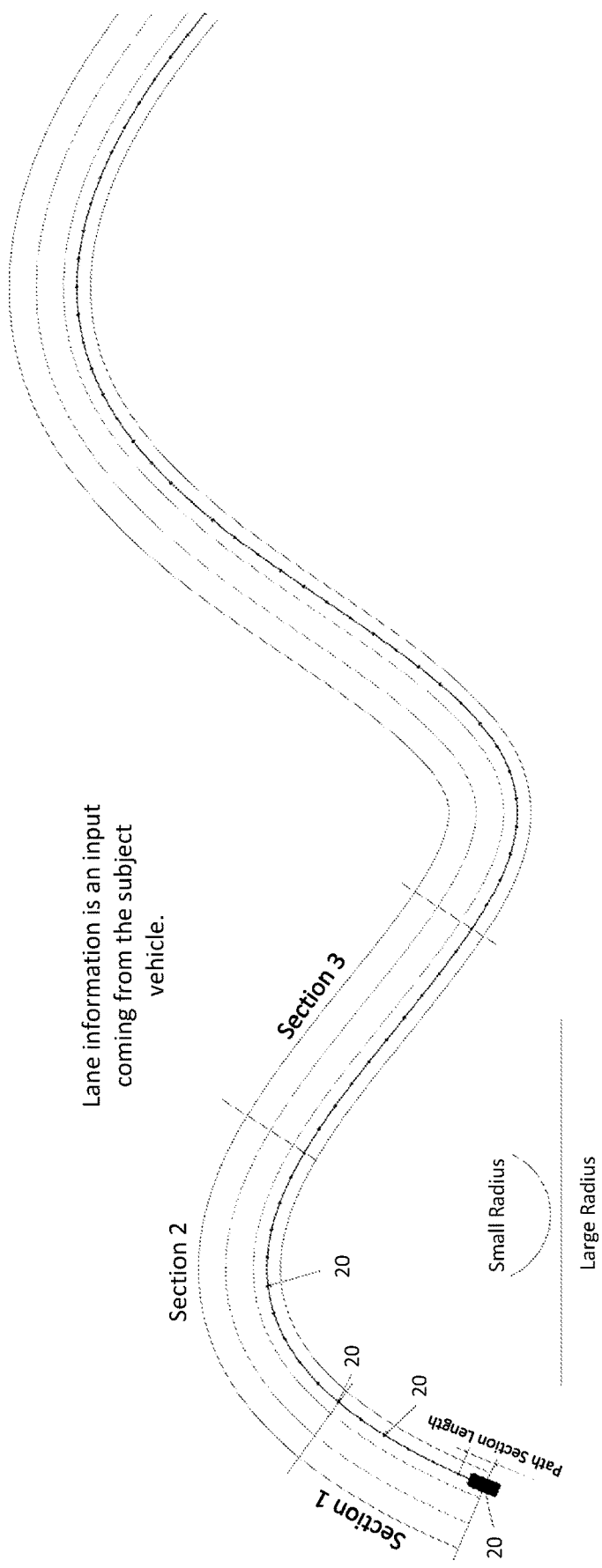
FIG. 2 is a plan view of a vehicle on a road with a planned route or path of travel along the road and along the lane in which the vehicle is located.
Figure 2A:
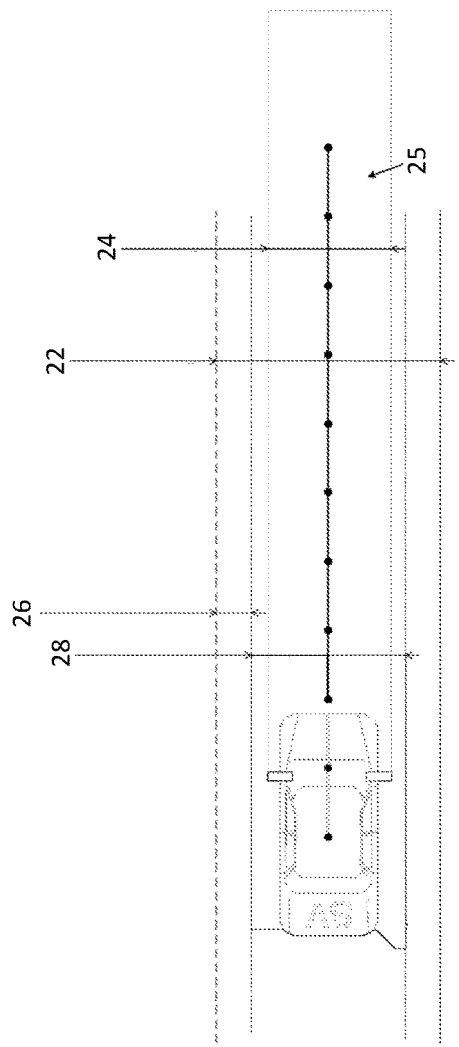
FIG. 2A is a plan view of the vehicle, showing the segments of the planned path ahead of the vehicle.

As discussed above, the path planner of the present invention may draft a primary path in a first phase. It may put successive way points 20 onto the current lane the vehicle has occupied at fixed distances (such as, for example, at 8 m distance to one another), such as shown in FIG. 2 (i.e., Path Section Length). In the first phase, the way points 20 may be put into the middle of the free space of the according lane in front of the ego vehicle and beyond (such as, for example, up to or more than 400 m ahead of the vehicle). As shown in FIG. 2A, the path planner may divide the road into a number of widths and boundaries. For example, the path planner may determine overall lane width 22 and a driving width 24 (i.e., the width of the vehicle) of a driving tube or corridor 25. The path planner may also determine a safety area 26 width and boundaries and a usable lane area 28. The usable lane area 28 may be the overall lane width 22 minus the width of the safety area 26. The usable lane area 28 is the handling area available for the path planner to generate a path.

Figure 2B:
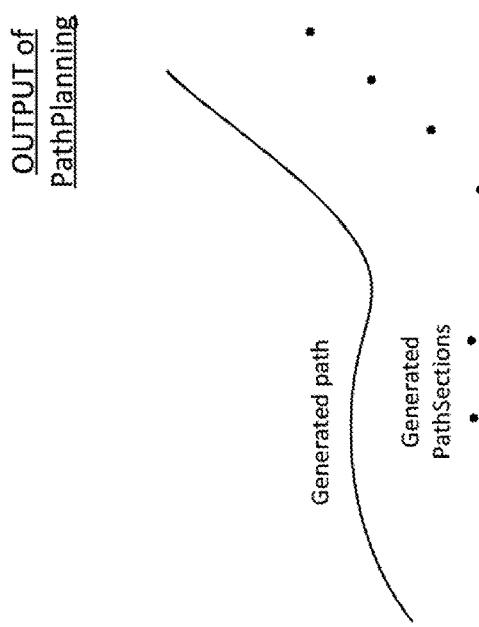
FIG. 2B is a graph showing the output of the path planning algorithm.
Figure 3:
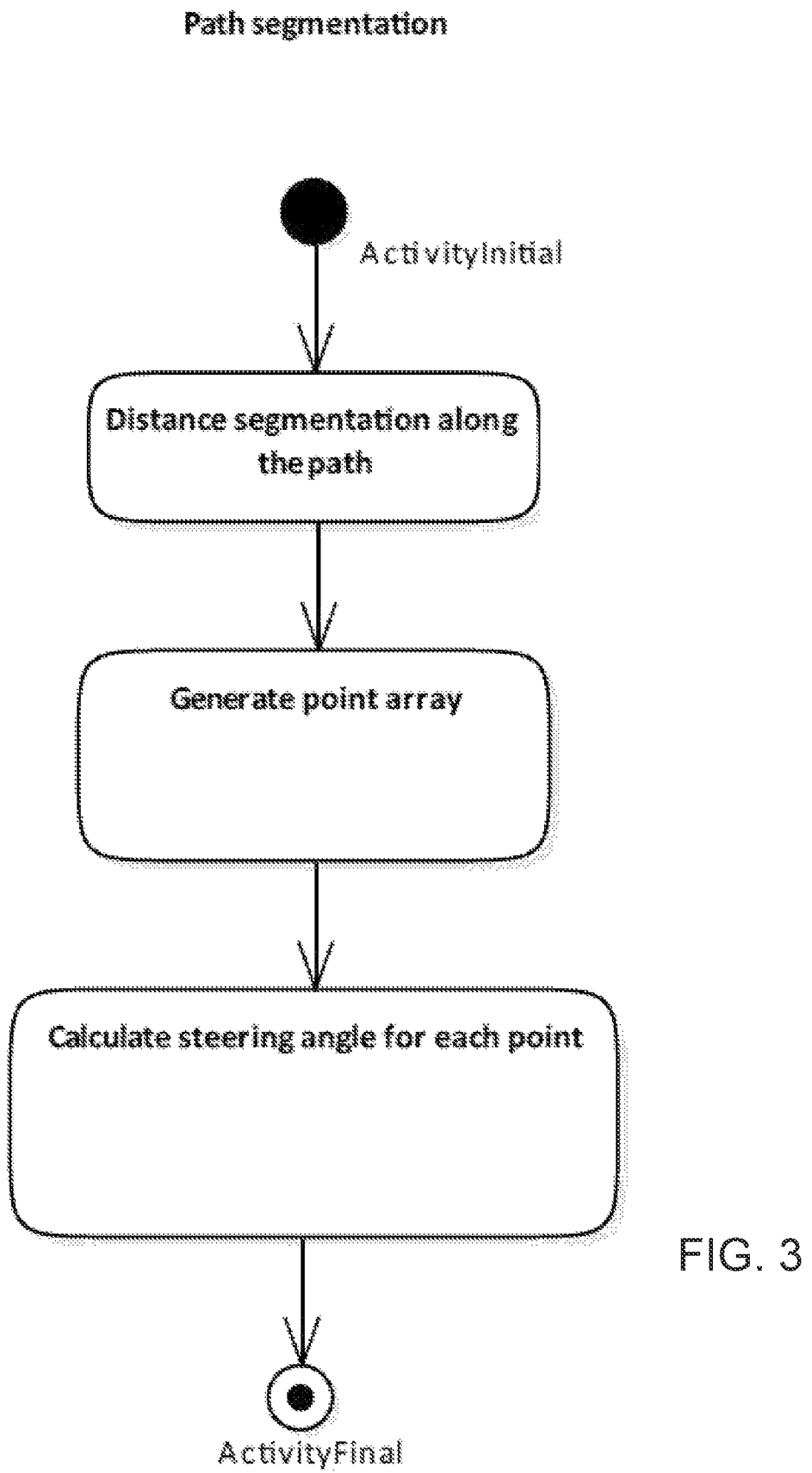
FIG. 3 is a flow chart showing the steering angle calculation based on a generated point array.

Referring now to FIG. 2B, the output of the path planner may include generated way points or path sections and a generated path. Each path section may be associated with a corresponding steering angle (for example, in degrees). The path planner attempts to meet several goals when generating a path. For example, the path planner may attempt to maximize a distance between the subject vehicle and the safety area 26 boundaries. The path planner may also attempt to ensure that the lane boundaries 22 and safety area 26 boundaries are not crossed. The path planner may also attempt to minimize lateral forces due to small radii on the path (e.g., maximize the radii). The path planner may plan to reduce the way needed to reach the optimal path (e.g., activation situation). The path planner may also compensate for large deviations from the current path with path adaptation. Since the vehicle is typically less wide than a driving lane there is space left and right of the vehicle that the vehicle can occupy without violating the lane boundaries (see FIG. 3).

Figure 4:
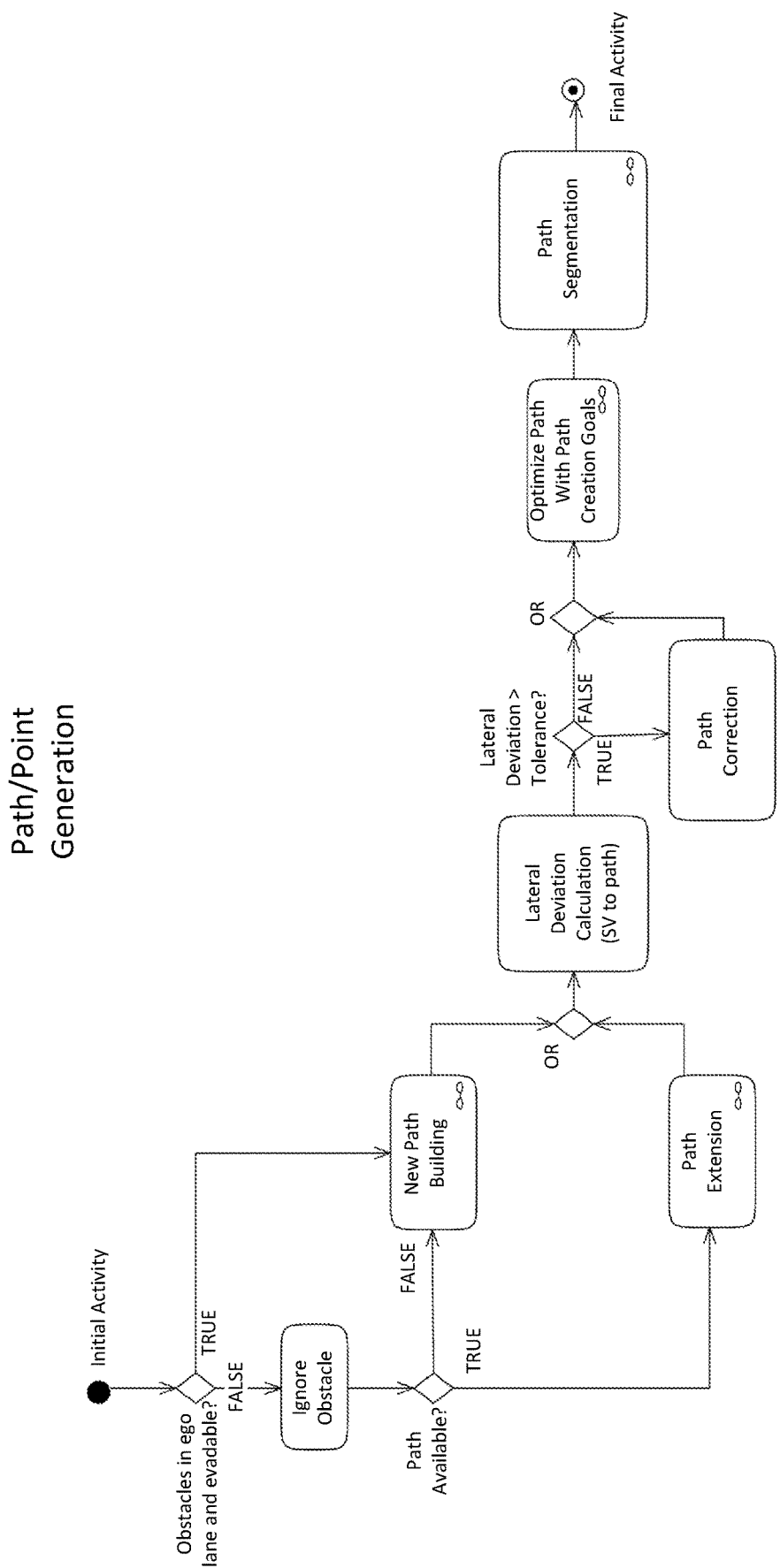
FIG. 4 is a flow chart showing the path segmentation.

FIG. 4 illustrates a flow chart for path or point generation. The prediction distance is dependent on sensor range and braking distance (mode parameters). First, the path planner determines if obstacles are in within the ego lane and if the obstacles are evadable (within the ego lane). If either determination is false, the path planner next ignores the obstacle for path calculation and determines if a path is now available. If a path is not available, the path planner proceeds to path extension, otherwise the path planner proceeds to new path building. If the path planner determines that the obstacles are evadable, the path planner proceeds straight to the new path building. Next, the path planner calculates a lateral deviation (the subject vehicle to the path). The path planner then determines if the calculated lateral deviation exceeds a tolerance. If the tolerance is exceeded, the path planner proceeds to path correction where each point is adapted as necessary to compensate deviations considering a changing rate of steering angle. The path planner then optimizes the path with respect to path creation goals and then performs path segmentation.

Figure 5:
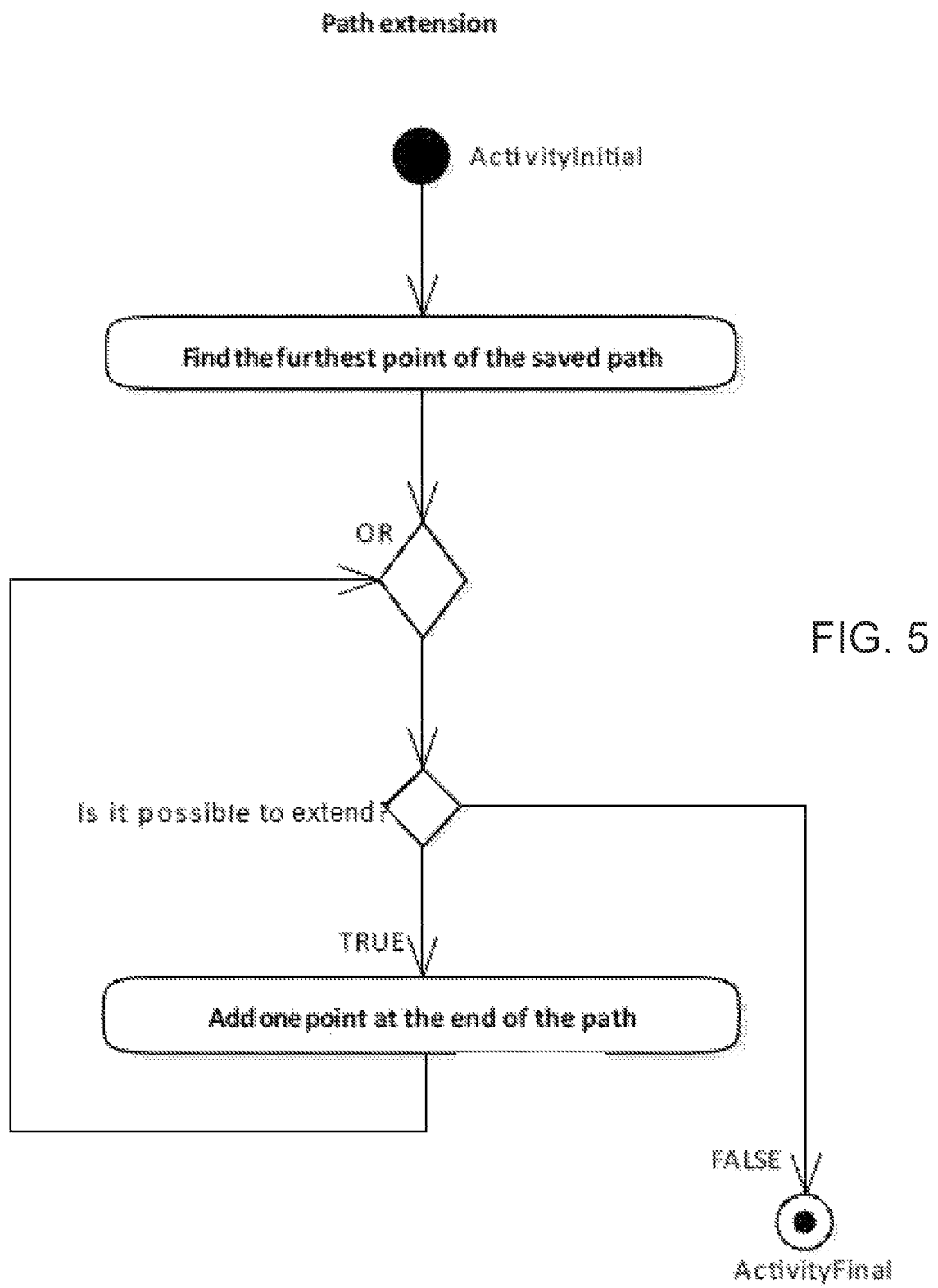
FIG. 5 is a flow chart showing the path extension process that adds a segment or point at the far end of the planned path.
Figure 6:
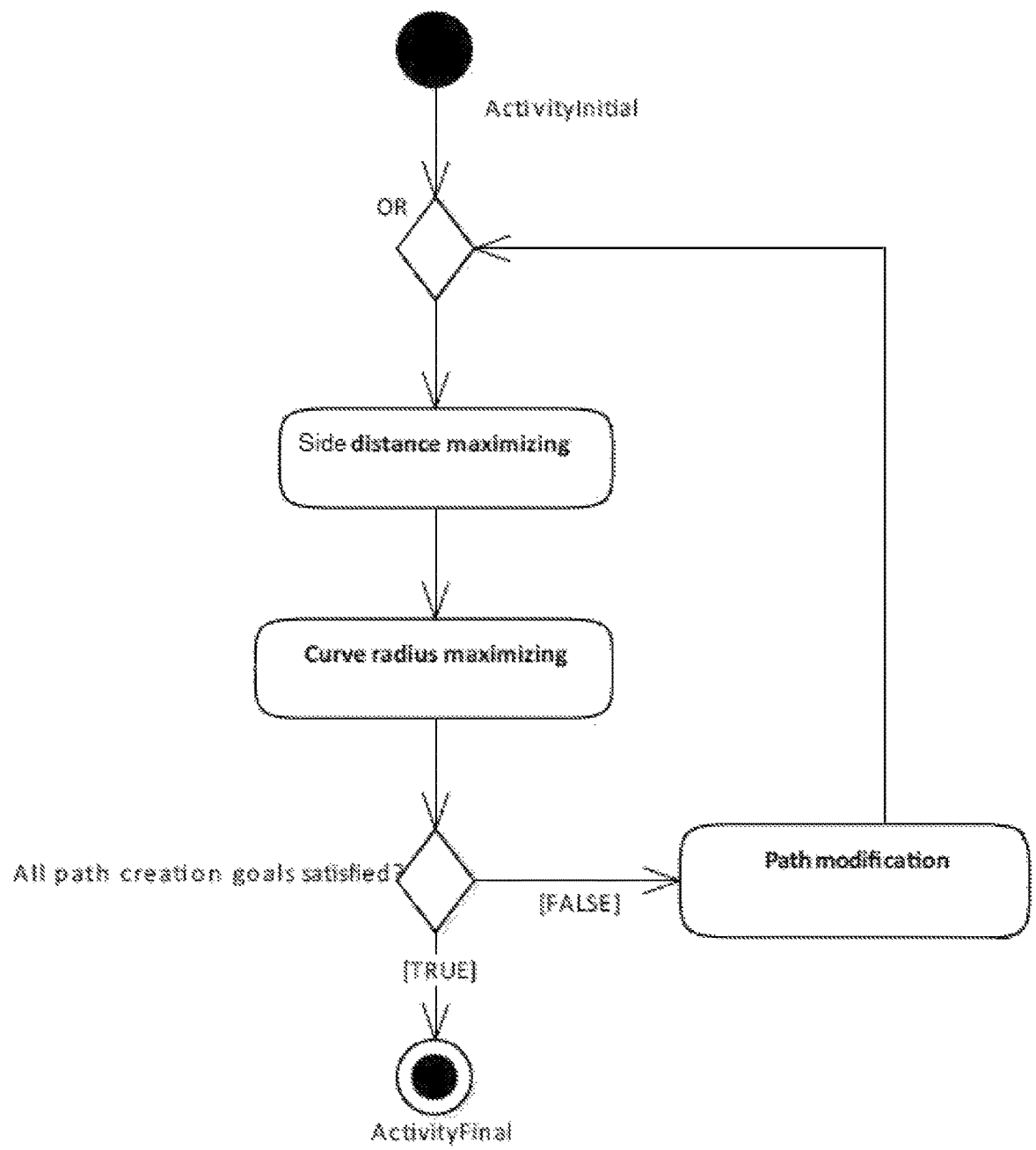
FIG. 6 is a flow chart showing optimization of the planned path due to path goals.

In a second phase, the path planner of the present invention may draft an optimized path by shifting the way points 20 from the first phase to the left or right which results in the vehicle path not necessarily being in the middle of the lane anymore, see FIG. 6. The optimization algorithm may optimize towards the goal to keep the curve radius as wide as possible to minimize the curve accelerations and to minimize the curve jerk, by that to minimize also the derivation of the curve acceleration, while keeping a safety distance between the planned path and the lane boundaries. For assuring that the way segments in between the way points 20 still have identical distances the way points 20 may get readjusted in the path direction by a third correction phase, see FIG. 5.

Figure 8A:
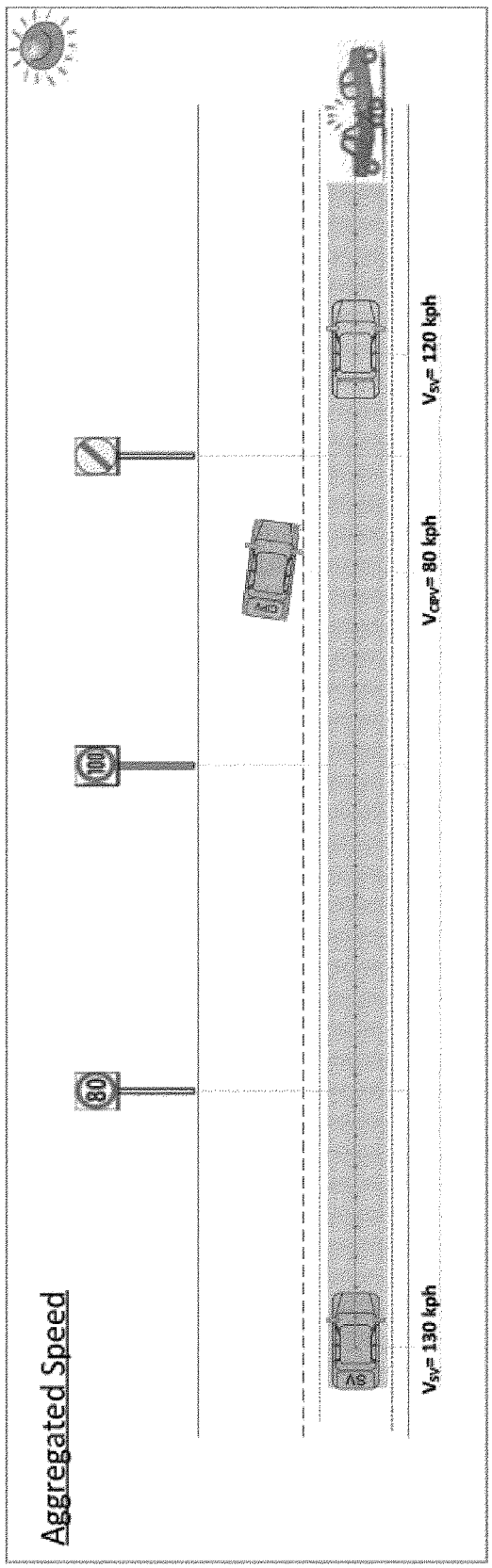
Figure 8B:
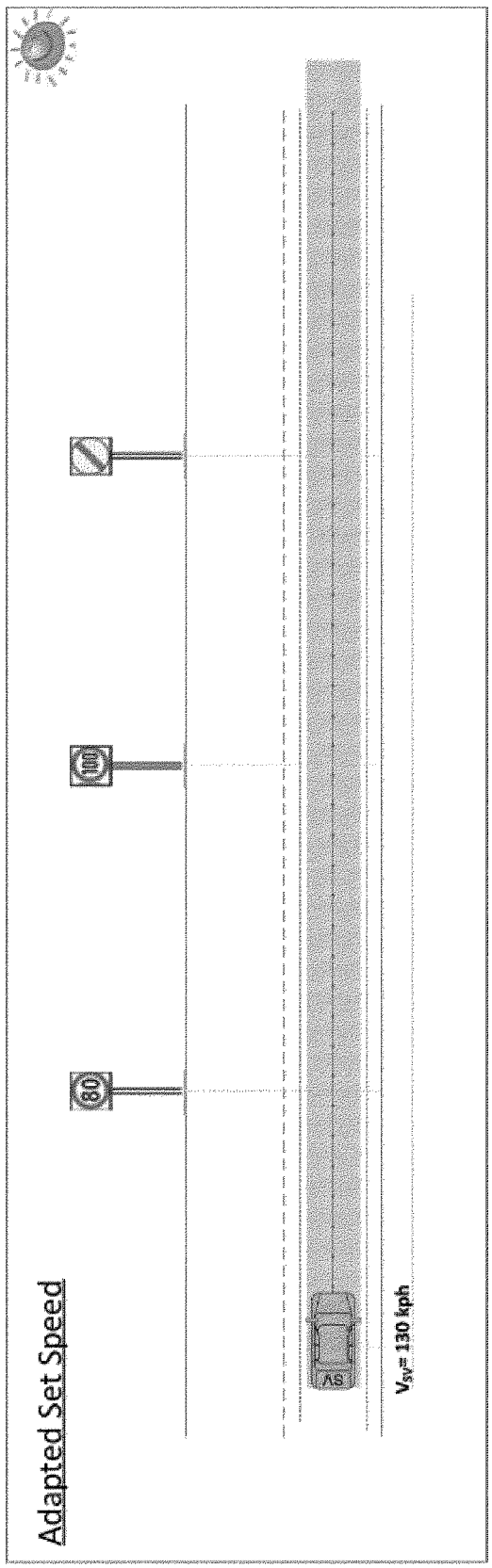

In a third phase, the path planner of the present invention drafts the speed profile to the planned path. Every way point 20 may receive a speed property. The speed may be determined by eight limiting boundaries which apply logically and combined, called aggregated speed (see FIG. 8A). First, the vehicle speed may be limited by the maximal speed set as desired maximal speed by the driver. Second, the vehicle speed may be limited by a maximal speed according a planned curve radius. Third, the vehicle speed may be limited by a maximal speed responsive to cross slope ratio or a summit slope ratio. Fourth, the vehicle speed may be limited responsive to environmental conditions especially the road friction, which may be reduced on wet, icy or snowy conditions, or when driving on gravel or cobblestone. Fifth, the vehicle speed may be limited responsive to limits pertaining to the sensor range (score) or reliability (score) or when single sensors are decelerated or fault at all. Sixth, the vehicle speed may be limited responsive to an unplanned event such as luggage dropping on the road within the vehicle path or a slow or stopped vehicle on the road within the vehicle path (see FIG. 8D). Seventh, the vehicle speed may be limited responsive to a legal speed limit (at a limit sign), such as shown in FIG. 8B. Eighth, the speed may be limited by the clearance ahead such as another vehicle is driving in front of the ego vehicle (see FIG. 8C).

Figure 9A:
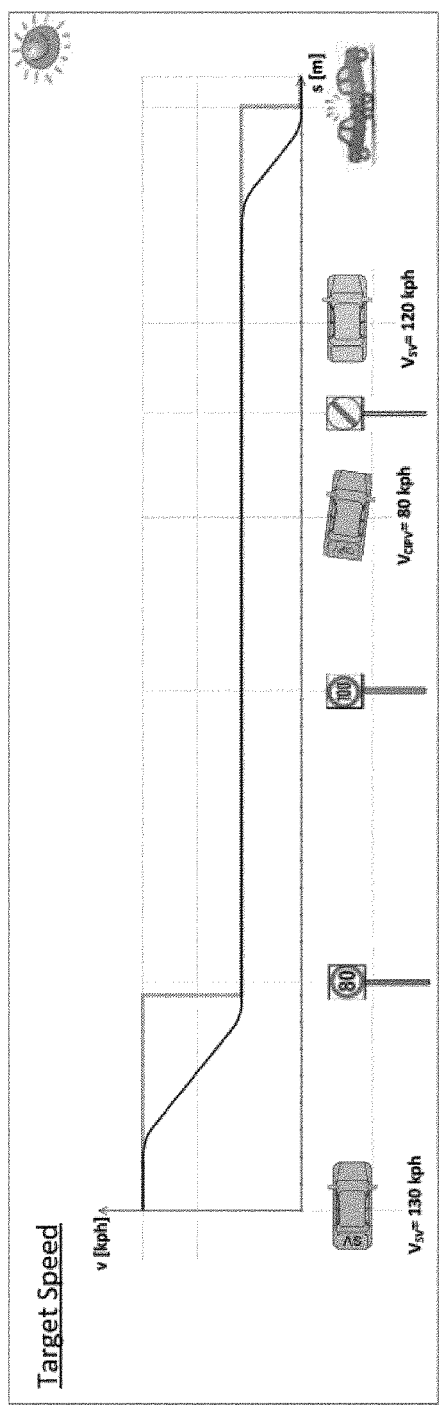
FIGS. 9A-E are plan view schematics showing a graph of the target speed of the vehicle along a planned path and adjustment of the speed depending on detection of other vehicles and/or detection of traffic signs.
Figure 9B:
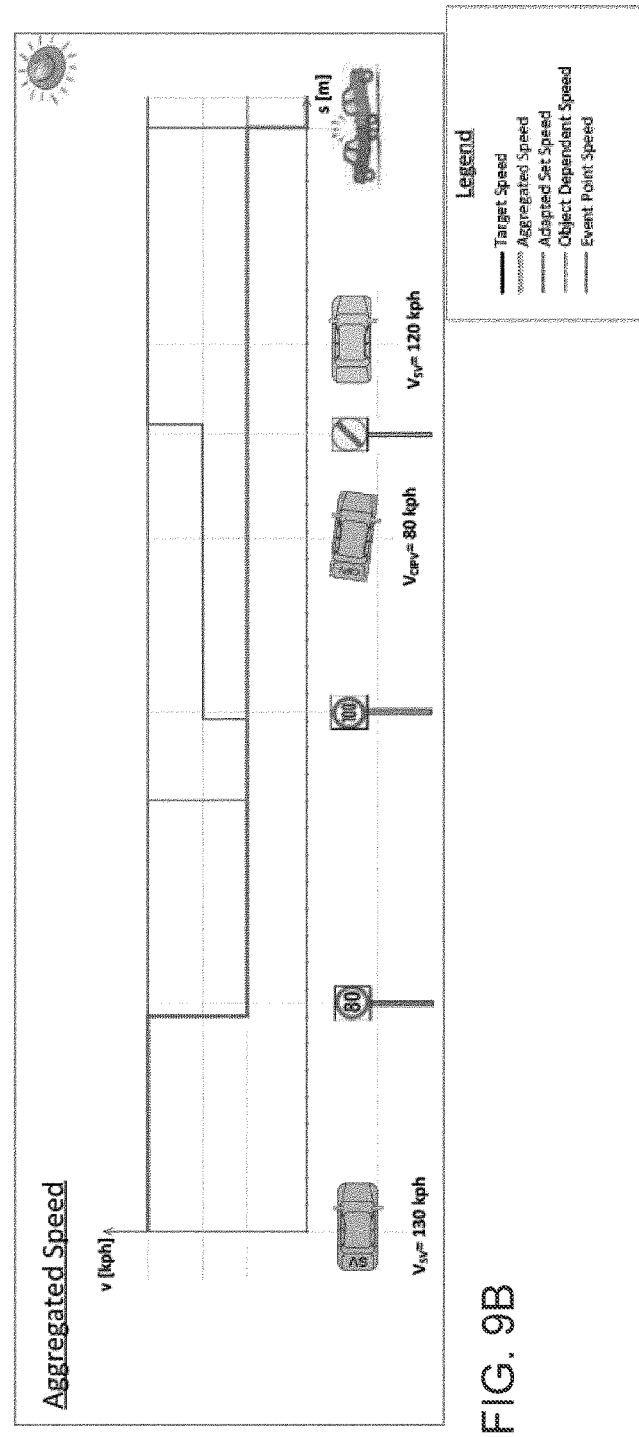
Figure 9C:
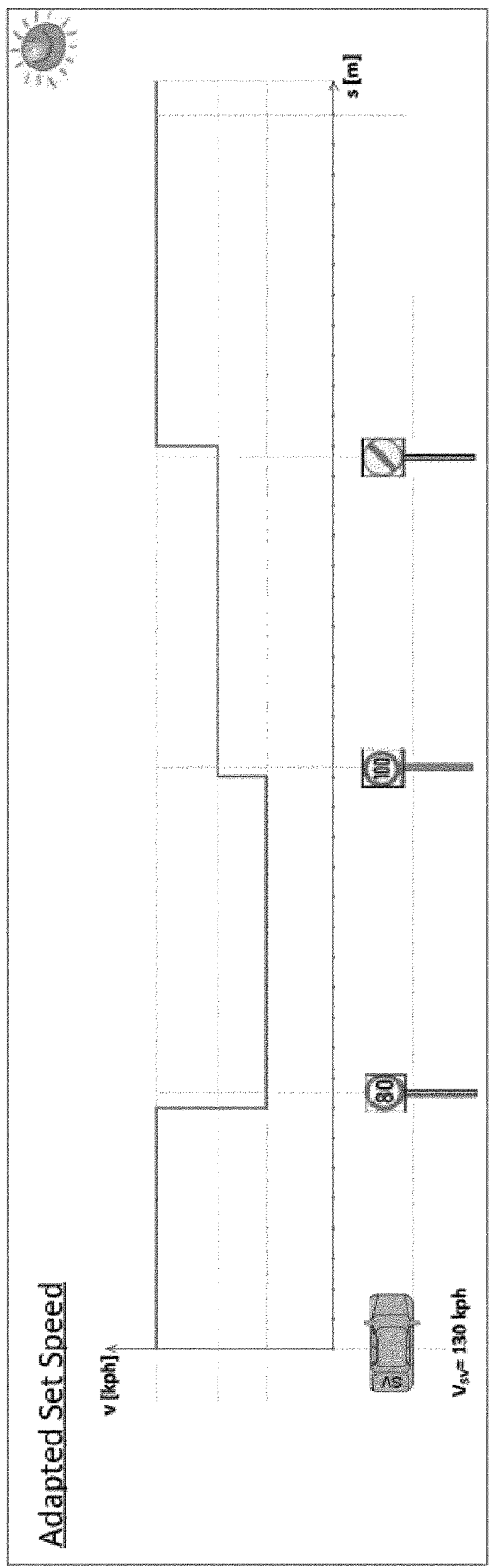
Figure 9D:
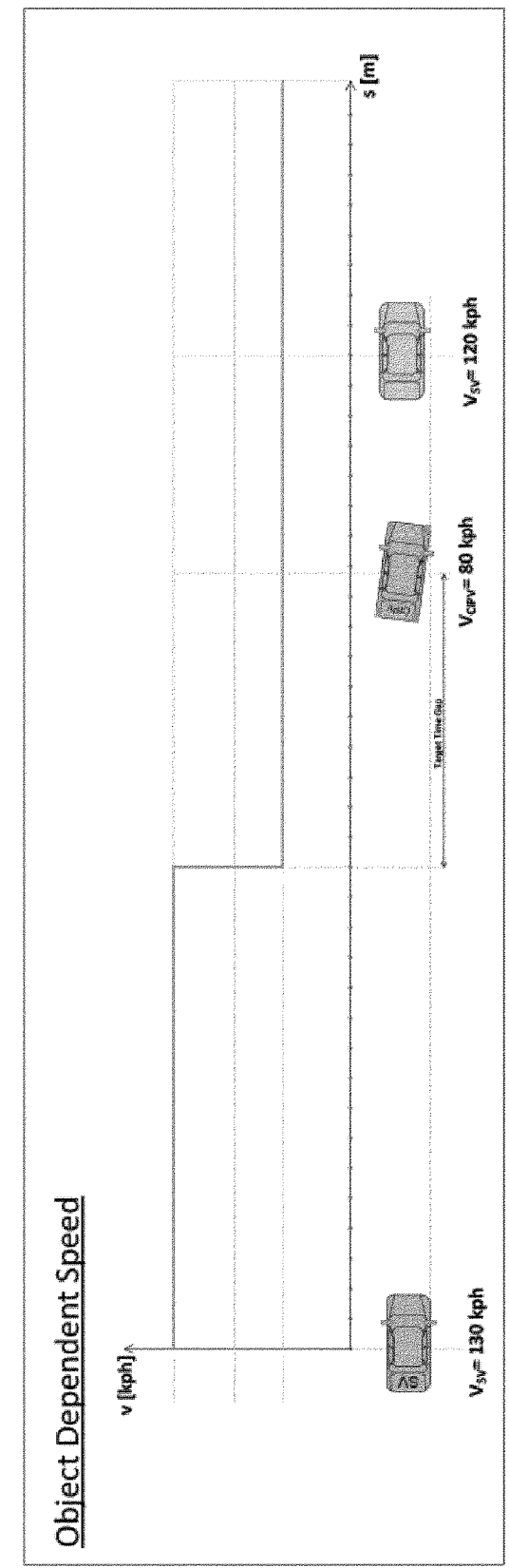
Figure 9E:
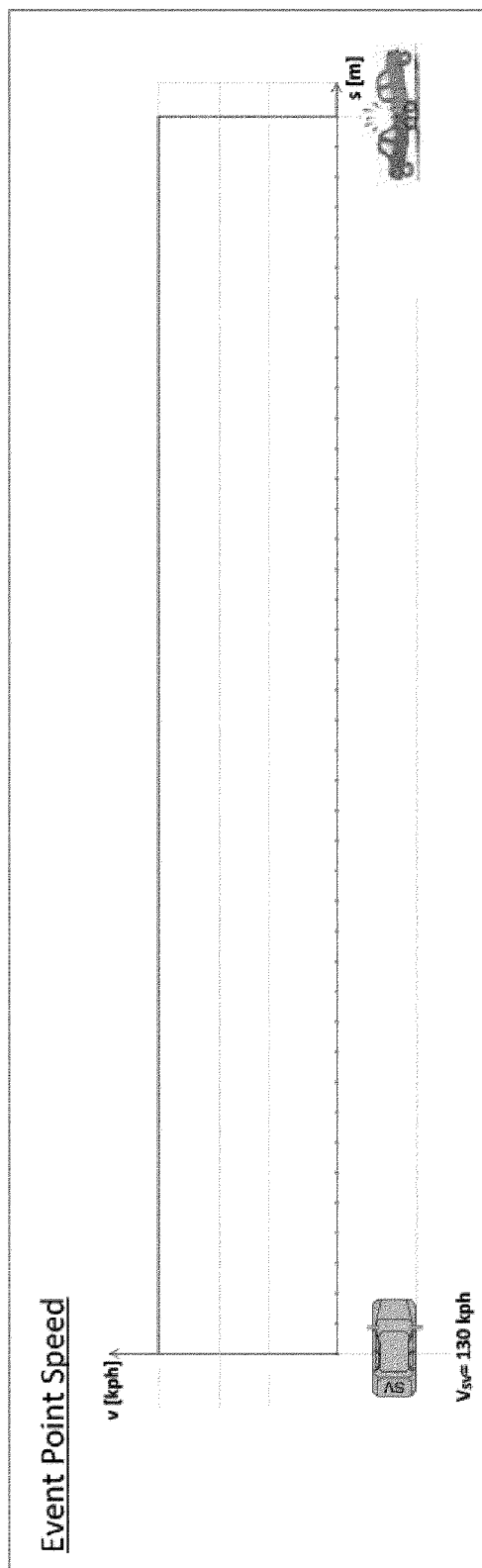

The path planner may plan the speed profile in a way to start decelerating early enough to meet the speed limit when passing the speed limit sign (see FIG. 9A). The acceleration may be planned in a way to start upon a speed limit zone ending sign. Optionally, when a speed limitation ends with having another speed limitation beginning in low further distance such as 500 m, the vehicle speed profile may be planned in a way to not exceed the upcoming speed limit within the unlimited interval in between the speed limits or just a little (see FIGS. 9B and 9C). Optionally, the speed profile may be adapted depending on objects or vehicles detected ahead of the ego vehicle and in the planned path of the vehicle (FIGS. 9D and 9E). Optionally, also the acceleration with consecutive deceleration may be reduced.

Figure 7:
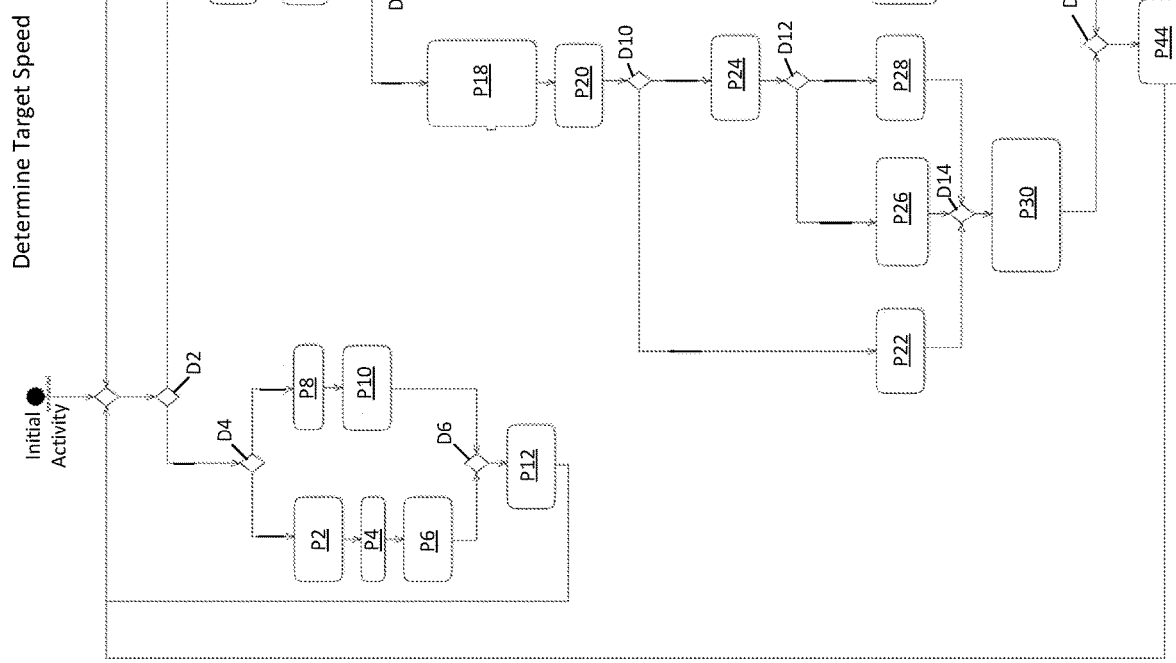
FIG. 7 is a flow chart of the path planning system.
Figure 10:
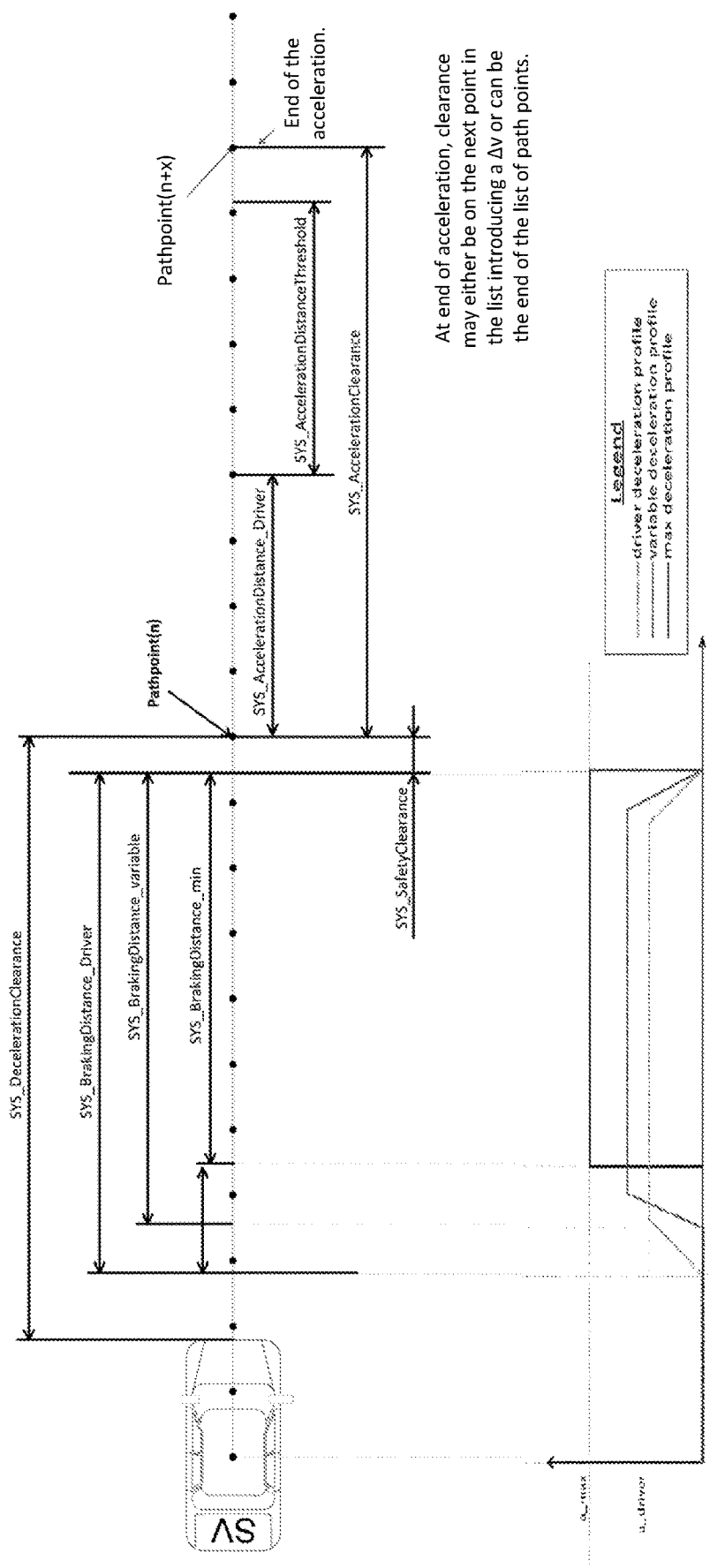
FIG. 10 is a plan view schematic showing adjustment of speed of the vehicle along the planned path.

The path planner according the invention may reflect acceleration profiles when planning speed profiles in general, see FIGS. 7 and 10. The acceleration and deceleration may be limited (independently) by a user setting such as having lower acceleration limits on a "comfort ride" setting compared to "sporty ride" settings. The deceleration so the braking ability may additionally limited by the tire grip, the brake condition such as disc heat or wear total mass, mass distribution and street slope. The acceleration may additionally be limited by the tire grip, the motor power, total mass, mass distribution, street slope and slightly by head wind.

For example, FIG. 7 illustrates the path planner determining the target speed. The path planner first determines if an aggregate speed list update is necessary at D2. If the update is necessary, the path planner determines at D4 if a new aggregated speed entry is available or if an item update for aggregated speed entry is available. If it is determined at D4 that the new entry is available, the path planner proceeds to P2, where every previous entry is moved one position up in an aggregated speed and target speed list. Then, at P4, the path planner adds the new value to the aggregated speed list. At P6, the new entry is marked in the aggregated speed list. If it is determined at D4 that an item update is available, the path planner, at P8, updates values in the aggregated speed list and, at P10, marks the updated entry and every after the updated entry. The path planner, from either path, proceeds through D6 and, at P12, copies the marked entry to the target speed list. The path planner then returns to D2.

If it is determined at D2 that an aggregated speed list update is not necessary, the path planner, at P14, searches for a first marked entry in the aggregated speed list. Then, at P16, the path planner compares an n aggregated speed entry with an n−1 aggregated speed entry. The path planner then, at D8, determines if the n entry is less than the n−1 entry, and if so, proceeds to P18. At P18, the path planner determines the path planner determines a distance to a deceleration clearance of the n entry by subtracting the path section at the vehicle's current position from the n entry of the path section. Next, at P20, the path planner determines a minimum braking distance. At D10, the path planner determines if the deceleration clearance is less than or equal to the combination minimum braking distance and the safety clearance. If it is, the path planner, at P22, determines a deceleration profile based on the vehicle's maximum long deceleration. If it is determined at D10 that the deceleration clearance is greater than the minimum braking distance plus the safety clearance, the path planner, at P24, determines a driver braking distance. At D12, the path planner determines if the deceleration clearance is greater than or equal to the driver braking distance plus the safety clearance. If so, the path planner, at P26, determines a deceleration profile based on driving style parameters (e.g., max long deceleration, max long positive jerk, and max long negative jerk). If it is determined at D12 that the deceleration clearance is less than the driver braking distance and the safety clearance, then, at P28, the path planner determines a deceleration profile based on the variable deceleration parameters (as jerk parameters may vary).

Then, at D14, the results of P22, P226, and P28 are XORed, and the path planner, at P30, calculates a target speed of the system by the equation:

$$SYS\_TargetSpeed=a(t)*t+SV\_CurrentSpeed;$$

where a(t) is the determined deceleration profile and SV_CurrentSpeed is the current speed of the subject vehicle.

Back at D8, if the path planner determines that the aggregated speed of the n entry is greater than the n−1 entry, then the path planner, at D16, determines if the aggregated speed of the n entry does not equal to an aggregated speed of an n+x entry, where x is greater than n and x is less than or equal to the list end. If so, the path planner, at P32, determines an acceleration clearance by subtracting the path section from the path section of the next delta. Then, at P34, the path planner determines an acceleration distance. At D18, the path planner determines if the acceleration clearance is greater than the acceleration distance plus an acceleration distance threshold. If so, at P36, the system determines an acceleration profile based on driving style parameters (e.g., max long ACC, max long positive jerk, max long negative jerk, and a delta in aggregated speed, such as between then entry and the n−1 entry). If, at D18, the acceleration clearance is less than the acceleration distance plus the acceleration distance threshold, the path planner, at P38, determines an acceleration profile based on driving style parameters (e.g., max long ACC, max long positive jerk, max long negative jerk, and a delta in aggregated speed, such as between the nextDeltaV entry and the n−1 entry).

Back at D16, if the aggregated speed at the n entry is equal to an aggregated speed of an n+x entry, where x is greater than n and x is less than or equal to the list end, then, the path planner, at P40, determines an acceleration profile based on driving style parameters (e.g., max long ACC, max long positive jerk, max long negative jerk, and a delta in aggregated speed, such as between the ListEnd entry and the n−1 entry). Then, at D20, the results from P36, P38, and P40 are XORed and the path planner, at P42, calculates a target speed of the system by the equation:

$$SYS\_TargetSpeed = a(t) * t + SYS\_AggregatedSpeed(n-1);$$

where a(t) is the determined acceleration profile. Then, at D22, both calculated speeds (from the acceleration profile and the deceleration profile) are XORed, and then, at P44, the target speed list is updated with the updated entries and the path planner returns to D2.

The deceleration profile of the path planner according the invention may use a driver set deceleration when the space ahead allows to meet the speed limit entries early enough. If not, the path planner according the invention may use a variable deceleration profile which may exceed the driver set deceleration profile's deceleration values but is still less the maximum deceleration capabilities of the vehicle. The maximum deceleration profile may find use in emergency braking events and may get avoided otherwise.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627;

7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, said vehicular control system comprising:
a control comprising a processor;
wherein said control determines a planned path of travel for a vehicle along a road being traveled by the vehicle and along a traffic lane in which the vehicle is traveling on the road;
wherein said control determines the planned path of travel responsive at least in part to at least one selected from the group consisting of (i) processing via said processor of said control of sensor data sensed by sensors of the vehicle, (ii) processing via said processor of said control of image data captured by at least one camera of the vehicle, (iii) map information, and (iv) a wireless communication from a remote system;
wherein the planned path of travel comprises a plurality of waypoints, and wherein a target speed is designated for each waypoint, and wherein the target speed represents an optimal a speed the vehicle should travel when passing through the respective waypoint;
wherein the control determines the target speed for each waypoint of the plurality of waypoints based on an aggregated speed, and wherein the aggregated speed comprises a minimum speed constraint of a plurality of speed constraints; wherein said control determines the aggregated speed responsive at least in part to (i) detection, via an object detection system of the vehicle, of an object along the determined planned path of travel, and (ii) determination of a speed limit change along the determined planned path of travel via one selected from the group consisting of (a) processing via said processor of said control of sensor data sensed by sensors of the vehicle, (b) processing via said processor of said control of image data captured by at least one camera of the vehicle, (c) map information, and (d) a wireless communication from a remote system;
wherein said control determines a speed profile having at least two different speeds for the vehicle to travel at as the vehicle travels along the determined planned path of travel, and wherein the at least two different speeds are based on a difference in the target speeds of at least two consecutive waypoints of the plurality of waypoints;
wherein said control determines an acceleration profile for the vehicle to follow as it changes from one speed of the speed profile to another speed of the speed profile, and wherein said control determines the acceleration profile responsive to at least one selected from the group consisting of (i) a user setting, (ii) tire grip and (iii) road slope; and
wherein said control controls the vehicle to maneuver the vehicle along the determined planned path of travel in accordance with the determined speed profile.

2. The vehicular control system of claim 1, wherein said control determines an initial planned path of travel along a center region of the traffic lane in which the vehicle is traveling.

3. The vehicular control system of claim 2, wherein said control adjusts waypoints along the initial planned path of travel at least in part responsive to (i) a radius of curvature of a curve in the road, (ii) an environmental condition, and (iii) a road surface friction condition.

4. The vehicular control system of claim 2, wherein said control adjusts the speed profile responsive at least in part to (i) a radius of curvature of a curve in the road, (ii) an environmental condition, and (iii) a road surface friction condition.

5. The vehicular control system of claim 1, wherein said control determines the planned path responsive at least in part to processing via said processor of said control of sensor data sensed by sensors of the vehicle.

6. The vehicular control system of claim 5, wherein said sensors comprise at least a plurality of radar sensors having fields of sensing exterior the vehicle.

7. The vehicular control system of claim 1, wherein said control determines the planned path of travel responsive at least in part to processing via said processor of said control of image data captured by at least one camera of the vehicle that has a field of view exterior the vehicle.

8. The vehicular control system of claim 1, wherein said control determines the planned path of travel responsive at least in part to map information.

9. The vehicular control system of claim 1, wherein said control determines the planned path of travel responsive at least in part to a wireless communication from a remote system.

10. The vehicular control system of claim 1, wherein said control determines the speed profile responsive at least in part to a user selected speed.

11. A vehicular control system, said vehicular control system comprising:

a control comprising a processor;

wherein said control determines a planned path of travel for a vehicle along a road being traveled by the vehicle and along a traffic lane in which the vehicle is traveling on the road;

wherein said control determines the planned path of travel responsive at least in part to at least one selected from a first group consisting of (i) processing via said processor of said control of sensor data sensed by sensors of the vehicle and (ii) processing via said processor of said control of image data captured by at least one camera of the vehicle and at least one selected from a second group consisting of (i) map information and (ii) a wireless communication from a remote system; wherein said control fuses data from the first group with data from the second group;

wherein the planned path of travel comprises a plurality of waypoints, and wherein a target speed is designated for each waypoint, and wherein the target speed represents an optimal a speed the vehicle should travel when passing through the respective waypoint;

wherein the control determines the target speed for each waypoint of the plurality of waypoints based on an aggregated speed, and wherein the aggregated speed comprises a minimum speed constraint of a plurality of speed constraints;

wherein said control determines the aggregated speed responsive at least in part to (i) detection, via an object detection system of the vehicle, of an object along the determined planned path of travel, and (ii) determination of a speed limit change along the determined planned path of travel via one selected from the group consisting of (a) processing via said processor of said control of sensor data sensed by sensors of the vehicle, (b) processing via said processor of said control of image data captured by at least one camera of the vehicle, (c) map information, and (d) a wireless communication from a remote system;

wherein said control determines a speed profile having at least two different speeds for the vehicle to travel at as the vehicle travels along the determined planned path of travel, and wherein the at least two different speeds are based on a difference in the target speeds of at least two consecutive waypoints of the plurality of waypoints;

wherein said control determines an acceleration profile for the vehicle to follow as it changes from one speed of the speed profile to another speed of the speed profile, and wherein said control determines the acceleration profile responsive to at least one selected from the group consisting of (i) a user setting, (ii) tire grip and (iii) road slope; and wherein said control controls the vehicle to maneuver the vehicle along the determined planned path of travel in accordance with the determined speed profile.

12. The vehicular control system of claim 11, wherein said control fuses data from the first group with data from the second group according to a geographical location of the vehicle.

13. The vehicular control system of claim 12, wherein said control determines an initial planned path of travel along a center region of the traffic lane in which the vehicle is traveling.

14. The vehicular control system of claim 13, wherein said control adjusts waypoints along the initial planned path of travel at least in part responsive to (i) a radius of curvature of a curve in the road, (ii) an environmental condition, and (iii) a road surface friction condition.

15. The vehicular control system of claim 11, wherein said control adjusts the speed profile responsive at least in part to (i) a radius of curvature of a curve in the road, (ii) an environmental condition, and (iii) a road surface friction condition.

16. The vehicular control system of claim 15, wherein said control determines the planned path responsive at least in part to processing via said processor of said control of sensor data sensed by sensors of the vehicle.

17. A vehicular control system, said vehicular control system comprising:

a control comprising a processor;

wherein said control determines a planned path of travel for a vehicle along a road being traveled by the vehicle and along a traffic lane in which the vehicle is traveling on the road;

wherein the planned path of travel comprises a plurality of path sections;

wherein each path section is associated with a corresponding steering angle;

wherein said control determines the planned path of travel responsive at least in part to at least one selected from the group consisting of (i) processing via said processor of said control of sensor data sensed by sensors of the vehicle, (ii) processing via said processor of said control of image data captured by at least one camera of the vehicle, (iii) map information, and (iv) a wireless communication from a remote system; wherein the planned path of travel comprises a plurality of waypoints, and wherein a target speed is designated for each waypoint, and wherein the target speed represents an optimal a speed the vehicle should travel when passing through the respective waypoint;

wherein the control determines the target speed for each waypoint of the plurality of waypoints based on an aggregated speed, and wherein the aggregated speed comprises a minimum speed constraint of a plurality of speed constraints; wherein said control determines the aggregated speed responsive at least in part to (i) detection, via an object detection system of the vehicle, of an object along the determined planned path of travel, and (ii) determination of a speed limit change along the determined planned path of travel via one selected from the group consisting of (a) processing via said processor of said control of sensor data sensed by sensors of the vehicle, (b) processing via said processor of said control of image data captured by at least one camera of the vehicle, (c) map information, and (d) a wireless communication from a remote system;

wherein said control determines a speed profile having at least two different speeds for the vehicle to travel at as the vehicle travels along the determined planned path of travel, and wherein the at least two different speeds are based on a difference in the target speeds of at least two consecutive waypoints of the plurality of waypoints;

wherein said control determines an acceleration profile for the vehicle to follow as it changes from one speed of the speed profile to another speed of the speed profile, and wherein said control determines the acceleration profile responsive to at least one selected from the group consisting of (i) a user setting, (ii) tire grip and (iii) road slope;

and wherein said control controls the vehicle to maneuver the vehicle along the path sections of the determined planned path of travel in accordance with the determined speed profile.

18. The vehicular control system of claim 17, wherein said control determines an initial planned path of travel along a center region of the traffic lane in which the vehicle is traveling.

19. The vehicular control system of claim 18, wherein said control adjusts waypoints along the initial planned path of travel at least in part responsive to (i) a radius of curvature of a curve in the road, (ii) an environmental condition, and (iii) a road surface friction condition.

20. The vehicular control system of claim 18, wherein said control adjusts the speed profile responsive at least in part to (i) a radius of curvature of a curve in the road, (ii) an environmental condition, and (iii) a road surface friction condition.

* * * * *

UNITED STATES PATENT AND TRADEMARK OFFICE
CERTIFICATE OF CORRECTION

| | | |
|---|---|---|
| PATENT NO. | : 11,453,393 B2 | Page 1 of 1 |
| APPLICATION NO. | : 16/154182 | |
| DATED | : September 27, 2022 | |
| INVENTOR(S) | : Richard Wienecke et al. | |

It is certified that error appears in the above-identified patent and that said Letters Patent is hereby corrected as shown below:

In the Specification

<u>Column 6</u>
Line 56, "between then entry" should be --between the $n$ entry--

In the Claims

<u>Column 9</u>
Lines 65-66, "represents an optimal a speed" should be --represents a speed--

<u>Column 11</u>
Lines 25-26, "represents an optimal a speed" should be --represents a speed--

<u>Column 12</u>
Lines 40-41, "represents an optimal a speed" should be --represents a speed--

Signed and Sealed this
First Day of November, 2022

Katherine Kelly Vidal
*Director of the United States Patent and Trademark Office*